United States Patent
Prociw

(10) Patent No.: US 10,578,021 B2
(45) Date of Patent: Mar. 3, 2020

(54) COMBUSTION SYSTEMS

(71) Applicant: Delavan Inc, West Des Moines, IA (US)

(72) Inventor: Lev A. Prociw, Johnston, IA (US)

(73) Assignee: Delavan Inc, West Des Moines, IA (US)

( * ) Notice: Subject to any disclaimer, the term of this patent is extended or adjusted under 35 U.S.C. 154(b) by 31 days.

(21) Appl. No.: 14/752,318

(22) Filed: Jun. 26, 2015

(65) Prior Publication Data

US 2016/0376997 A1    Dec. 29, 2016

(51) Int. Cl.
| | | |
|---|---|---|
| F02C 7/22 | (2006.01) | |
| F23D 11/10 | (2006.01) | |
| F23R 3/28 | (2006.01) | |
| F23R 3/14 | (2006.01) | |
| F23R 3/50 | (2006.01) | |
| F23D 11/44 | (2006.01) | |
| F23K 5/06 | (2006.01) | |
| F23R 3/60 | (2006.01) | |
| F23R 3/30 | (2006.01) | |
| F23R 3/00 | (2006.01) | |

(52) U.S. Cl.
CPC ............ *F02C 7/222* (2013.01); *F23D 11/101* (2013.01); *F23D 11/105* (2013.01); *F23D 11/107* (2013.01); *F23D 11/44* (2013.01); *F23K 5/06* (2013.01); *F23R 3/002* (2013.01); *F23R 3/14* (2013.01); *F23R 3/283* (2013.01); *F23R 3/286* (2013.01); *F23R 3/30* (2013.01); *F23R 3/50* (2013.01); *F23R 3/60* (2013.01); *F05D 2230/53* (2013.01); *F05D 2240/35* (2013.01); *F23R 2900/00015* (2013.01)

(58) Field of Classification Search
CPC .. F02C 7/222; F23R 3/14; F23R 3/286; F23R 3/30; F23R 3/50; F23R 2900/00015
See application file for complete search history.

(56) References Cited

U.S. PATENT DOCUMENTS

| | | |
|---|---|---|
| 2,552,851 A | 5/1951 | Gist |
| 2,554,401 A | 5/1951 | Christensen et al. |
| 2,920,449 A | 1/1960 | Johnson et al. |

(Continued)

FOREIGN PATENT DOCUMENTS

| | | |
|---|---|---|
| EP | 1564495 A1 | 8/2005 |
| EP | 2530383 A1 | 12/2012 |

(Continued)

OTHER PUBLICATIONS

Extended European Search Report issued in corresponding European Patent Application No. EP 16176291.7, dated Nov. 28, 2016.

(Continued)

*Primary Examiner* — Gerald L Sung
*Assistant Examiner* — Marc J Amar
(74) *Attorney, Agent, or Firm* — Locke Lord LLP; Scott D. Wofsy; Joshua L. Jones

(57) ABSTRACT

A combustion system for a gas turbine engine includes a combustor dome. The combustor dome includes a fuel manifold with an inlet and nozzle components of a plurality of nozzles circumferentially spaced around the combustor dome. The fuel manifold and nozzle components are integrated with the combustor dome for fluid communication from the inlet to the nozzle components.

14 Claims, 5 Drawing Sheets

(56) References Cited

U.S. PATENT DOCUMENTS

| | | | | |
|---|---|---|---|---|
| 4,158,949 A * | 6/1979 | Reider | ............ | F23R 3/50 60/737 |
| 4,180,972 A * | 1/1980 | Herman | ............ | F23R 3/60 60/751 |
| 5,231,833 A * | 8/1993 | MacLean | ............ | F02C 7/222 60/734 |
| 5,271,219 A * | 12/1993 | Richardson | ............ | F23R 3/10 60/39.11 |
| 5,279,112 A * | 1/1994 | Halila | ............ | F02M 37/0017 285/13 |
| 5,353,599 A | 10/1994 | Johnson et al. | | |
| 5,479,772 A * | 1/1996 | Halila | ............ | F23R 3/002 60/747 |
| 5,524,430 A * | 6/1996 | Mazeaud | ............ | F23R 3/283 60/752 |
| 5,653,109 A * | 8/1997 | Overton | ............ | F02C 7/222 60/739 |
| 5,765,366 A * | 6/1998 | Beeck | ............ | F02C 7/222 239/431 |
| 5,791,148 A * | 8/1998 | Burrus | ............ | F01D 5/18 60/749 |
| 5,937,653 A * | 8/1999 | Alary | ............ | F23R 3/10 60/737 |
| 6,212,870 B1 * | 4/2001 | Thompson | ............ | F23R 3/14 60/746 |
| 6,286,298 B1 * | 9/2001 | Burrus | ............ | F23R 3/50 60/732 |
| 6,298,667 B1 * | 10/2001 | Glynn | ............ | F23R 3/002 29/889.2 |
| 6,474,070 B1 * | 11/2002 | Danis | ............ | F02G 1/055 60/739 |
| 8,365,533 B2 | 2/2013 | Johnson et al. | | |
| 8,893,382 B2 | 11/2014 | Patterson et al. | | |
| 8,943,835 B2 | 2/2015 | Corsmeier et al. | | |
| 2002/0162333 A1 * | 11/2002 | Zelina | ............ | F23R 3/14 60/776 |
| 2006/0123792 A1 * | 6/2006 | Xu | ............ | F23R 3/14 60/737 |
| 2008/0016869 A1 | 1/2008 | Fish et al. | | |
| 2008/0083223 A1 * | 4/2008 | Prociw | ............ | F02C 7/222 60/739 |
| 2009/0013694 A1 * | 1/2009 | Hernandez | ............ | F23R 3/002 60/752 |
| 2009/0111063 A1 * | 4/2009 | Boardman | ............ | F23R 3/14 431/8 |
| 2010/0077758 A1 | 4/2010 | Rudrapatna et al. | | |
| 2011/0000216 A1 * | 1/2011 | Imamura | ............ | F23R 3/14 60/748 |
| 2016/0138807 A1 * | 5/2016 | Mongia | ............ | F23R 3/286 60/776 |

FOREIGN PATENT DOCUMENTS

FR 85730 E * 10/1965 ............... F23R 3/20
WO WO-2015038274 A1 3/2015

OTHER PUBLICATIONS

Partial European Search Report dated Apr. 11, 2019, issued during the prosecution of European Patent Application No. EP 19153956.8 (10 pages).

* cited by examiner

COMBUSTION SYSTEMS

BACKGROUND OF THE INVENTION

1. Field of the Invention

The present disclosure relates to combustion, and more particularly to combustion systems such as used in gas turbine engines.

2. Description of Related Art

A variety of devices and methods are known in the art for combustion. Of such devices, many are directed to combustion for gas turbine engines. Traditionally, fuel in gas turbine engines is supplied through fuel injectors for combustion within a combustor. The fuel injectors were connected to the upstream wall, or combustor dome, of the combustor and were required to be small enough to be removed without opening the engine case completely. This allowed for frequent changing out of injectors. But more and more demanding performance requirements are driving an increasing trend towards injectors with larger and larger nozzles.

Such conventional methods and systems have generally been considered satisfactory for their intended purpose. However, there is still a need in the art for improved combustion systems. The present disclosure provides a solution for this need.

SUMMARY OF THE INVENTION

A combustion system for a gas turbine engine includes a combustor dome. The combustor dome includes a fuel manifold with an inlet and nozzle components of a plurality of nozzles circumferentially spaced around the combustor dome. The fuel manifold and nozzle components are integrated with the combustor dome for fluid communication from the inlet to the nozzle components.

The inlet can be radially outboard of the nozzle components for supplying fuel to the manifold from a source external to the combustor dome. The nozzle components can include a wetted inner nozzle wall in fluid communication with the fuel manifold for each nozzle, and the nozzle components can include a respective fuel distributor outboard of the wetted inner nozzle wall for each nozzle, wherein a fuel circuit is defined between the wetted inner nozzle wall and the fuel distributor of each nozzle.

The nozzle components of each nozzle can include a fuel circuit outboard of an inner air passage. The nozzle components of each nozzle can include an inner insulation shell lining the inner air passage, and an outer insulation shell lining the nozzle outboard of the fuel circuit. It is also contemplated that the nozzle components of each nozzle can include a radial swirler upstream of the inner air passage for swirling air flowing into the inner air passage. Each radial swirler can be mounted to the combustor dome with fasteners passing through radial swirler vanes of the radial swirler, wherein the radial swirler vanes are hollow to permit radial thermal expansion of the radial swirler independent from the combustor dome.

The fuel manifold can form an outer combustor dome ring, wherein the nozzle components extend from the outer combustor dome ring radially inward to an inner combustor dome ring. The inner combustor dome ring can be circumferentially segmented to accommodate thermal expansion and contraction of the combustor dome. The system can include an outer cowl extending from the outer combustor dome ring and an inner cowl extending from the inner combustor dome ring, wherein the inner and outer cowlings cooperate to form an annular diverging inlet for feeding compressor discharge air to the nozzles. The inner and outer cowls can be mounted to the inner and outer combustor dome rings, respectively, with clips on the upstream and downstream sides of the combustor dome. The clips can be proximate the fuel manifold to provide heat shielding to the fuel manifold. Each of the inner and outer cowls can form a continuous shell devoid of support structures obstructing flow to the nozzles.

A combustor for a gas turbine engine includes an inner combustor wall. An outer combustor wall is radially outboard of the inner combustor wall. The inner and outer combustor walls define a combustion space therebetween with an upstream inlet and a downstream outlet. A combustor dome, as described above, connects between the inner and outer combustor walls.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
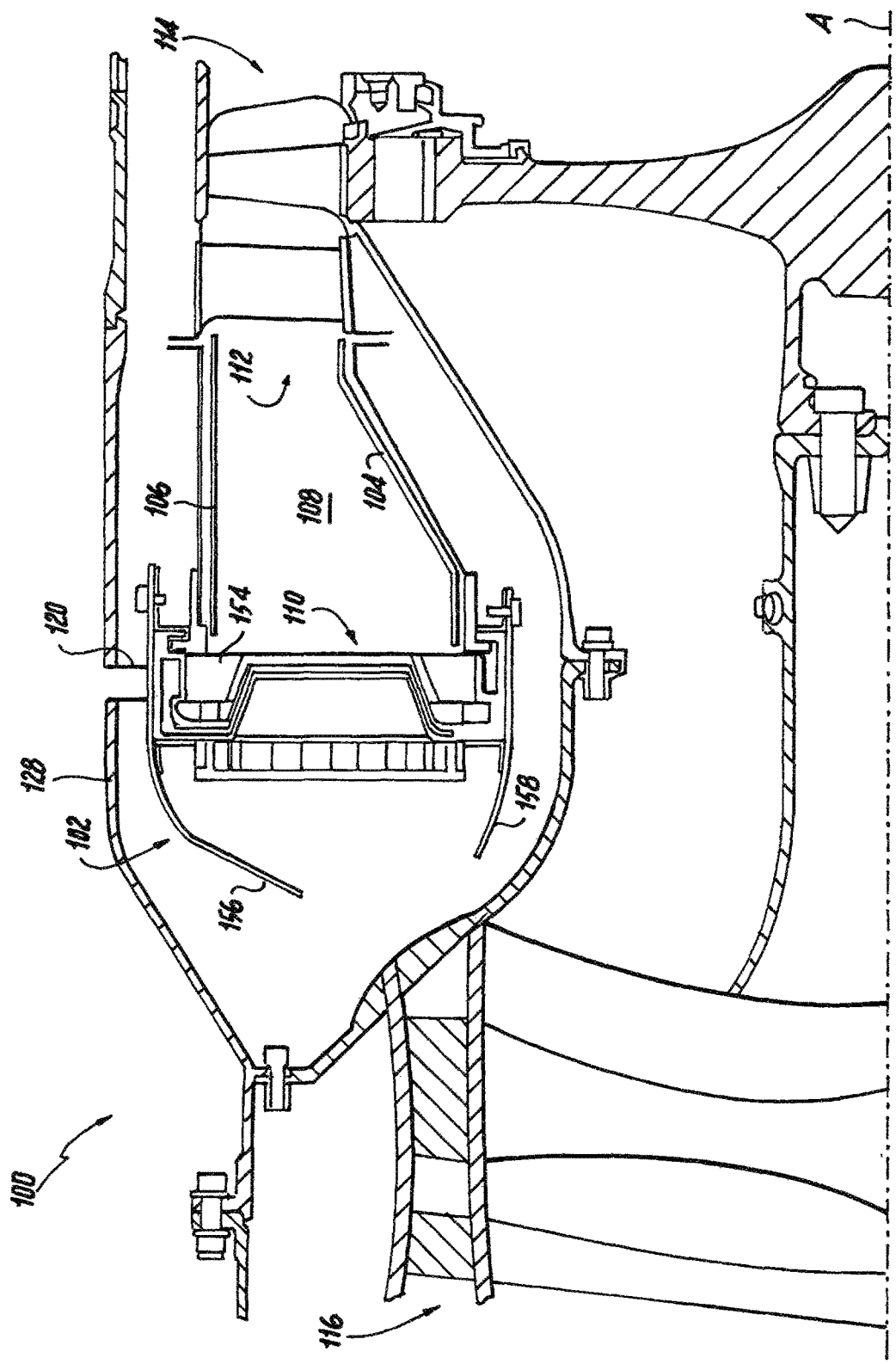
FIG. 1 is a cross-sectional side elevation view of an exemplary embodiment of a combustion system constructed in accordance with the present disclosure, showing a combustor in fluid communication between a compressor and a turbine in a gas turbine engine.

Reference will now be made to the drawings wherein like reference numerals identify similar structural features or aspects of the subject disclosure. For purposes of explanation and illustration, and not limitation, a partial view of an exemplary embodiment of a combustion system in accordance with the disclosure is shown in FIG. 1 and is designated generally by reference character 100. Other embodiments of combustion systems in accordance with the disclosure, or aspects thereof, are provided in FIGS. 2-8, as will be described. The systems and methods described herein can be used for combustion in gas turbine engines.

Combustion system 100 for a gas turbine engine includes a combustor dome 102 connecting between the inner and outer combustor walls 104 and 106, respectively, to form a combustor. Outer combustor wall 106 is radially outboard of inner combustor wall 104, such that the inner and outer combustor walls 104 and 106 define an annular combustion space 108 therebetween with an upstream inlet 110, e.g., for receiving fuel and compressed air, and a downstream outlet 112, e.g., for providing pressurized combustion products to a downstream turbine 114. Compressor 116 is connected in fluid communication with combustor dome 102 to provide compressor discharge air to the inlet 110 of the combustion space 108. Compressor 116, combustor dome 102, and turbine 114 are annular components centered on engine centerline axis A.

Figure 2:
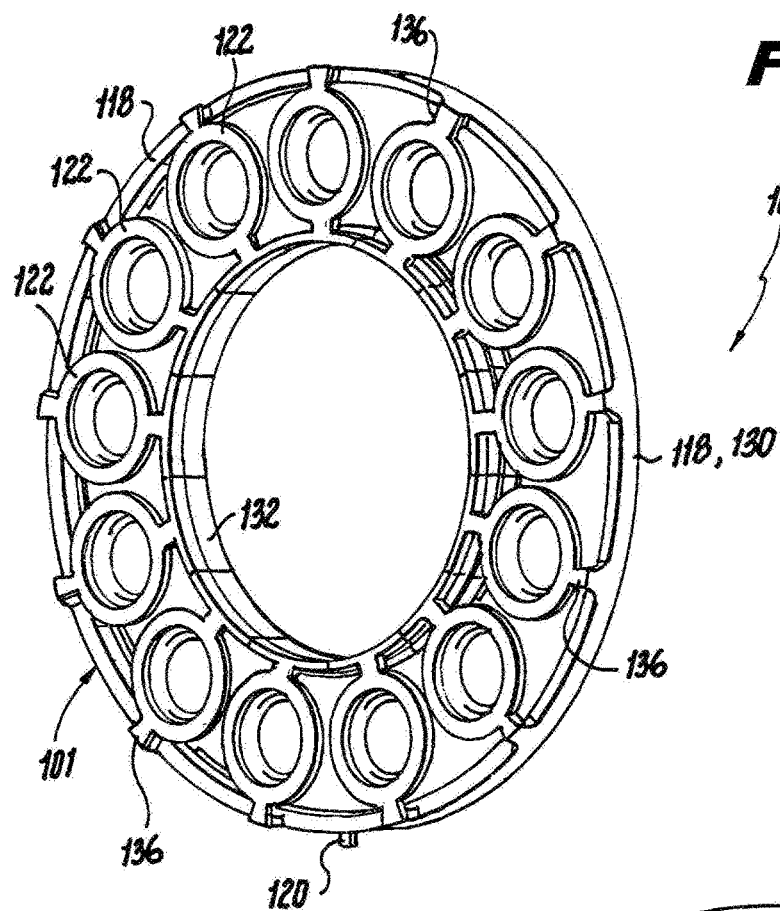
FIG. 2 is a perspective view of a portion of the combustion system of FIG. 1, showing a combustor dome with integrated fuel manifold and nozzle components.
Figure 3:
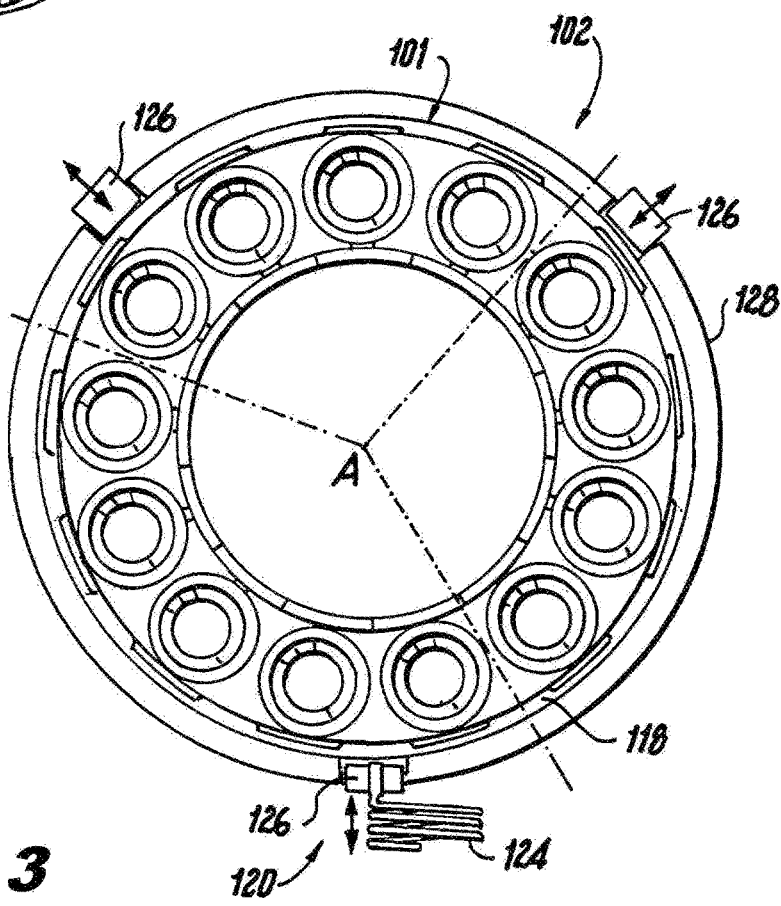
FIG. 3 is an axial outlet end view of the combustor dome of FIG. 2.

Referring now to FIGS. 2 and 3, combustor dome 102 includes a frame 101 with an integral fuel manifold 118 having an inlet 120 and nozzle components 122 of a plurality of nozzles circumferentially spaced around combustor dome 102. Fuel manifold 118 and nozzle components 122 are integrated with the combustor dome 102 for fluid communication from inlet 120 to the nozzle components 122. Those skilled in the art will readily appreciate that with the fuel manifold 118 and nozzle components 122 integrated into the combustor dome 102, the traditional nozzle feed arms extending from outside the combustor and extensive fuel manifolding external to the combustor for feeding each nozzle are eliminated.

Inlet 120 is radially outboard of the nozzle components 122 for supplying fuel to the manifold from a source external to the combustor dome. A flexible fitting 124 can be used to connect inlet 120 with the fuel source, e.g. by way of a fuel control system. If required for a given application, multiple fittings 124 and inlets 120 can be used. Radially inserted slip pins 126 can be used to support combustor dome 102 from engine case 128, so as to accommodate differential thermal expansion and contraction between combustor dome 102 and the surrounding components such as engine case 128 and the fuel systems connected by fitting 124.

With continued reference to FIGS. 2 and 3, frame 101 includes inner and outer combustor dome rings 132 and 130. Fuel manifold 118 can form an outer combustor dome ring 130, wherein the nozzle components 122 extend inward from the outer combustor dome ring radially inward to an inner combustor dome ring 132. The inner combustor dome ring 132 is circumferentially segmented, with one segment per nozzle, to accommodate thermal expansion and contraction of the combustor dome. Another way of accommodating thermal expansion and contraction in combustor dome 102 in addition to or in lieu of segmenting inner ring 132 is to segment the entire combustor dome, e.g., along the dashed lines in FIG. 3, wherein each segment would have its own inlet 120 and separate manifold 118 for feeding its subset of nozzles. The structure of combustor dome 102 as shown in FIGS. 2 and 3 can be fabricated and brazed, additively manufactured, e.g., complete with internal nozzle details, or can be produced using any other suitable processes.

Figure 4:
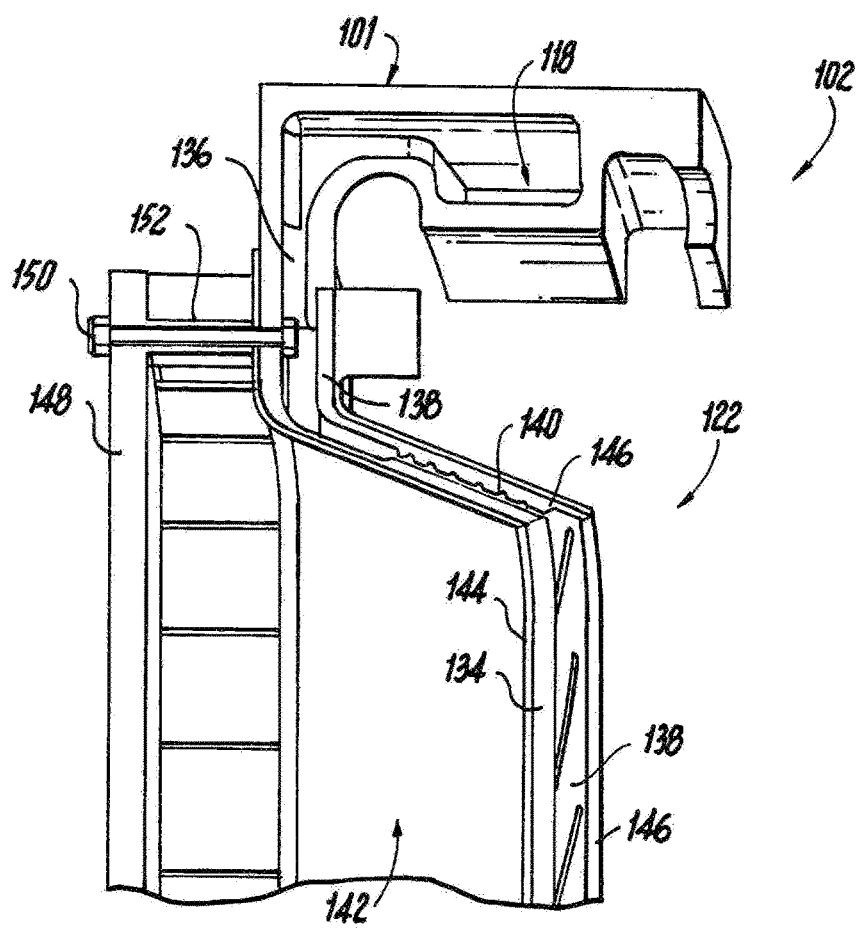
FIG. 4 is a cross-sectional perspective view of a portion of the combustion system of FIG. 1, showing the combustor dome with additional nozzle components.

Referring now to FIG. 4, the nozzle components can include a wetted inner nozzle wall 134 in fluid communication with the fuel manifold 118 for each nozzle, through a respective neck passage 136. Manifold 118, and wetted inner nozzle wall 134 are optionally made integral with one another, e.g., by additive manufacturing. The nozzle components 122 also include a respective fuel distributor 138 outboard of the wetted inner nozzle wall 138 for each nozzle. Distributor 138 can be brazed in place, can be formed together with combustor dome 102 by additive manufacturing, or can be produced/attached using any other suitable technique. A fuel circuit, e.g., including helical fuel passages 140, is defined between the wetted inner nozzle wall 134 and the fuel distributor 138 of each nozzle. The fuel circuit is outboard of an inner air passage 142. The nozzle components 122 of each nozzle can include an optional inner insulation shell 144 lining the inner air passage 142 for thermal insulation between the fuel circuit and inner air passage 142, as needed for particular applications. An outer insulation shell 146 optionally lines the nozzle outboard of the fuel circuit for thermal insulation between the combustion space 108 and the fuel circuit as needed for specific applications. The nozzle components 122 of each nozzle also include a radial swirler 148 upstream of the inner air passage 142 for swirling air flowing into the inner air passage 142. Each radial swirler 148 is mounted to the combustor dome 102 with fasteners 150 passing through radial swirler vanes 152 of radial swirler 148. At least some of the radial swirler vanes 152 are hollow to permit this type of attachment with radial thermal expansion of the radial swirlers 148 independent from frame 101 of combustor dome 102.

Figure 5:
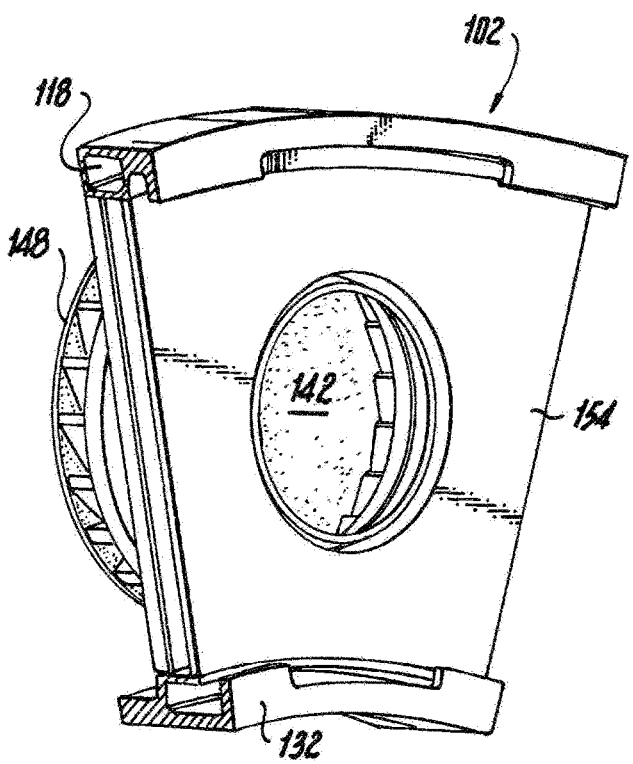
FIG. 5 is a perspective view of a portion of the combustor dome of FIG. 2, showing a tile mounted to the combustor dome on the downstream side.

Referring now to FIG. 5, a tile 154 is affixed downstream of each nozzle to complete the combustor dome 102, wherein the tiles 154 interlock with their circumferentially adjacent tiles 154 to force air flow to the combustion space 108 to pass through nozzle components 122.

Figure 6:
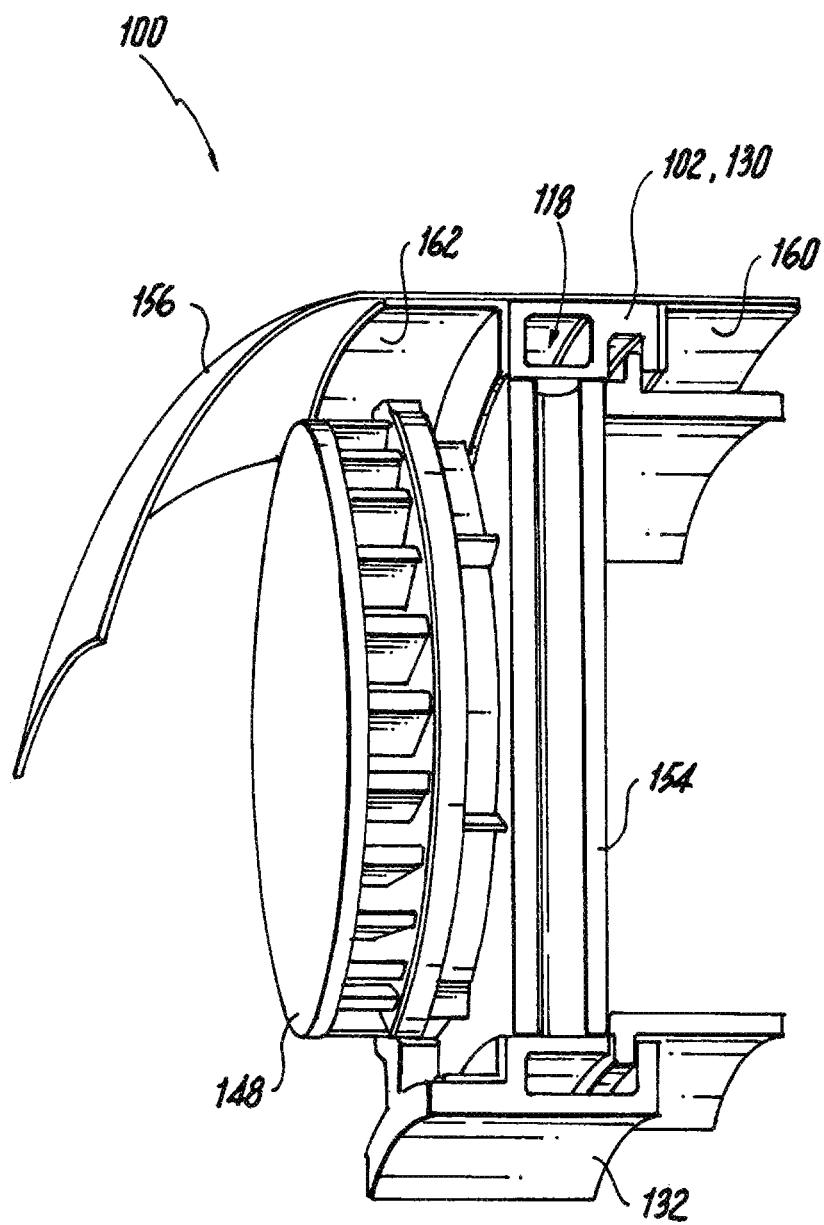
FIG. 6 is a cross-sectional perspective view of a portion of the combustor dome of FIG. 5, showing an outer cowl with manifold heat shield.
Figure 7:
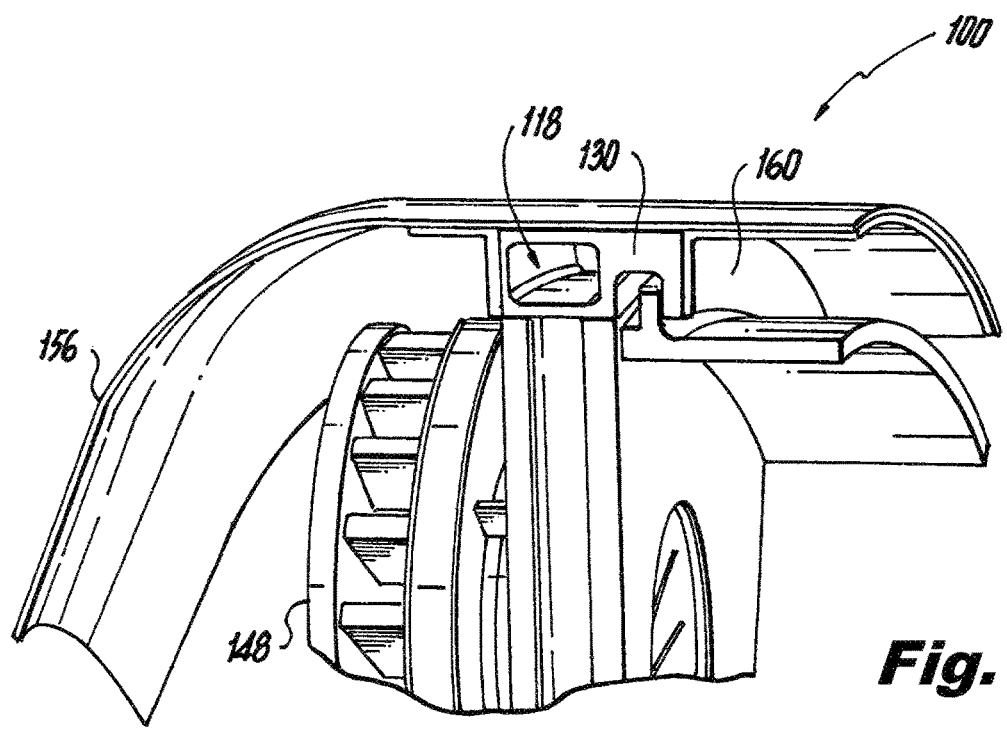
FIG. 7 is a cross-sectional perspective view of a portion of the outer cowl of FIG. 6, showing a clip securing the outer cowl on the downstream side of the combustor dome.
Figure 8:
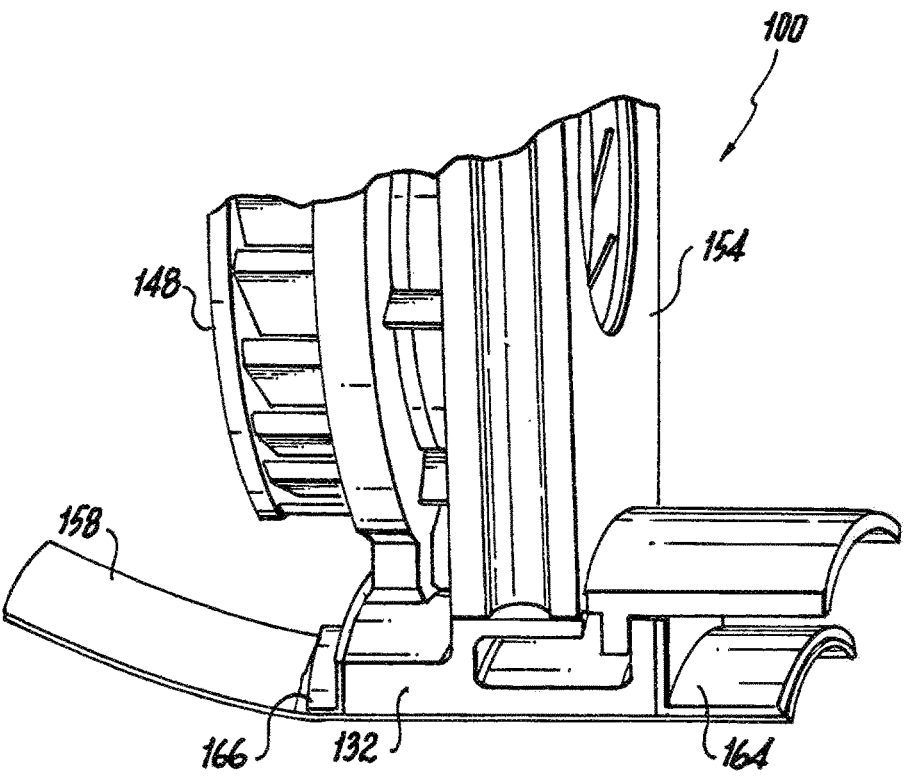
FIG. 8 is a cross-sectional perspective view of a portion of combustor dome of FIG. 5, showing an inner cowl mounted to the combustor dome.

Combustion system 100 includes an outer cowl 156 extending from outer combustor dome ring 130, as shown in FIG. 6, and an inner cowl 158 extending from inner combustor dome ring 132, wherein the inner and outer cowlings 156 and 158 cooperate to form an annular diverging inlet for feeding compressor discharge air to the nozzles, as shown in FIG. 1. This recovers air pressure and provides heat shielding to fuel manifold 118, and adds stiffness to the structure of combustor dome 102. The inner and outer cowls 158 and 156 are mounted to the inner and outer combustor dome rings 132 and 130, respectively, with clips 160, 162, 164, and 166 on the upstream and downstream sides of the combustor dome 102 to accommodate thermal expansion and contraction. Clips 160 and 162 of the outer cowl 156, shown in FIGS. 7 and 6, respectively, are proximate the fuel manifold 118 to provide heat shielding to the fuel manifold 118. Clips 166 of the inner cowl 158 provide support on the upstream side of combustor dome 102, and clips 164 on the downstream side of combustor dome 102 are similar to clips 160 of the outer cowl 156, as shown in FIG. 8. Each of the inner and outer cowls 158 and 156 forms continuous, self-supporting shell devoid of support structures, such as support struts or fairings, obstructing flow to the nozzles.

The nozzles and combustor domes described herein provide many potential advantages over the traditional configurations. The fuel nozzles can now integrate a large majority of the combustor and fuel manifold into the nozzle structure. The nozzles and combustor dome can be engineered for maintenance/replacement to coincide with the replacement of other engine components such as turbines, where the engine case must be opened. Therefore, the nozzles do not need to be small enough to be extracted through the case and combustor. The larger nozzles can provide advantages including more efficient mixing large amounts of fuel and air, and the nozzle air can be used to cool the combustor, simplifying combustor design. The combustor itself can be substantially simplified with combustor domes such as disclosed herein. Thermal mismatch between the combustor and engine case can be decoupled from the nozzle/combustor interface. The weight of heavy stems (feed arms or the like), flanges, and engine case reinforcement can be reduced or eliminated. Having the fuel manifold inside the engine, i.e. integrated in the combustor dome, means the fuel manifold resides closer to the nozzles, reducing the amount of wetted walls of the fuel system. Common features between the nozzles and combustor can be unitized for construction.

The methods and systems of the present disclosure, as described above and shown in the drawings, provide for combustion systems with superior properties including improved combustion efficiency, reduced weight, and reduction of fuel lines. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A combustion system for a gas turbine engine comprising:
    a combustor dome including a fuel manifold with an inlet and nozzle components of a plurality of nozzles circumferentially spaced around the combustor dome wherein the fuel manifold and nozzle components are integrated with the combustor dome for fluid communication from the inlet to the nozzle components, wherein the fuel manifold forms an outer combustor dome ring, wherein the nozzle components extend from the outer combustor dome ring radially inward to an inner combustor dome ring;
    further comprising a plurality of radial slip pins extending radially outward from the combustor dome, wherein the fuel manifold forming the outer combustor dome ring is radially inward from the radial slip pins, for mounting the combustor dome with the fuel manifold within a surrounding engine case; and
    a plurality of tiles included in the combustor dome, wherein the tiles interlock to force air flow through the nozzle components,
    wherein the inner combustor dome ring is wholly radially inward from the nozzle components, and the plurality of tiles, and wherein the inner combustor dome ring, the outer ring of the fuel manifold, and a radially outer end of each of the plurality of tiles are at the same location axially with respect to a centerline axis of the gas turbine engine.

2. A combustion system as recited in claim 1, wherein the inlet is radially outboard of the nozzle components for supplying fuel to the manifold from a source external to the combustor dome.

3. A combustion system as recited in claim 1, wherein the nozzle components include an inner nozzle wall in fluid communication with the fuel manifold for each nozzle.

4. A combustion system as recited in claim 3, wherein the nozzle components include a respective fuel distributor outboard of the inner nozzle wall for each nozzle, wherein a fuel circuit is defined between the inner nozzle wall and the fuel distributor of each nozzle.

5. A combustion system as recited in claim 1, wherein the nozzle components of each nozzle include a fuel circuit outboard of an inner air passage.

6. A combustion system as recited in claim 5, wherein the nozzle components of each nozzle include an inner insulation shell lining the inner air passage, and an outer insulation shell lining the nozzle outboard of the fuel circuit.

7. A combustion system as recited in claim 5, wherein the nozzle components of each nozzle include a radial swirler upstream of the inner air passage for swirling air flowing into the inner air passage.

8. A combustion system as recited in claim 7, wherein each radial swirler is mounted to the combustor dome with fasteners passing through radial swirler vanes of the radial swirler, wherein the radial swirler vanes are hollow to permit radial thermal expansion of the radial swirler independent from the combustor dome.

9. A combustion system as recited in claim 1, wherein the inner combustor dome ring is circumferentially segmented to accommodate thermal expansion and contraction of the combustor dome.

10. A combustion system as recited in claim 1, further comprising an outer cowl extending from the outer combustor dome ring and an inner cowl extending from the inner combustor dome ring, wherein the inner and outer cowlings cooperate to form an annular diverging inlet for feeding compressor discharge air to the nozzles.

11. A combustion system as recited in claim 10, wherein the inner and outer cowls are mounted to the inner and outer combustor dome rings, respectively, with clips on upstream and downstream sides of the combustor dome.

12. A combustion system as recited in claim 11, wherein the clips are proximate the fuel manifold so the clips can provide heat shielding to the fuel manifold.

13. A combustion system as recited in claim 1, wherein each of the inner and outer cowls forms a continuous shell devoid of support structures obstructing flow to the nozzles.

14. A combustor for a gas turbine engine comprising:
    an inner combustor wall;
    an outer combustor wall radially outboard of the inner combustor wall, wherein the inner and outer combustor walls define a combustion space between the inner and outer combustor walls with an upstream inlet and a downstream outlet; and
    a combustor dome between the inner and outer combustor walls connecting to the inner and outer combustor walls, the combustor dome including a fuel manifold with an inlet and nozzle components of a plurality of nozzles circumferentially spaced around the combustor dome wherein the fuel manifold and nozzle components are integrated with the combustor dome for fluid communication from the inlet to the nozzle components, wherein a plurality of tiles is included in the combustor dome, wherein the tiles interlock to force air flow through the nozzle components;
    further comprising a plurality of radial slip pins extending radially outward from the combustor dome, wherein the fuel manifold is radially inward from the radial slip pins, the radial slip pins mounting the combustor dome within an engine case surrounding the outer combustor wall and combustor dome with the fuel manifold within the engine case, and wherein an inner combustor dome ring is wholly radially inward from the nozzle components and the plurality of tiles, and wherein the inner combustor dome ring, the outer ring of the fuel manifold, and a radially outer end of each of the plurality of tiles are at the same location axially with respect to a centerline axis of the gas turbine engine.

* * * * *